(12) United States Patent
Xia

(10) Patent No.: US 7,730,762 B2
(45) Date of Patent: Jun. 8, 2010

(54) DEVICE AND METHOD FOR TESTING ISOLATION STRUCTURE

(76) Inventor: Chang Xia, Fuzhou Planning Design and Research Institute, No. 188, Hudong Road, Gulou District, Fuzhou (CN) 350003

( * ) Notice: Subject to any disclaimer, the term of this patent is extended or adjusted under 35 U.S.C. 154(b) by 79 days.

(21) Appl. No.: 12/207,591

(22) Filed: Sep. 10, 2008

(65) Prior Publication Data

US 2009/0064798 A1  Mar. 12, 2009

(30) Foreign Application Priority Data

Sep. 12, 2007  (CN) .................. 2007 1 0009508

(51) Int. Cl.
*G01M 19/00*  (2006.01)
*G01M 7/06*  (2006.01)
*G01N 3/30*  (2006.01)
*G01L 5/00*  (2006.01)

(52) U.S. Cl. .................... 73/11.04; 73/579; 73/594; 73/666; 73/862.56

(58) Field of Classification Search ............... 73/11.04, 73/594, 666, 862.56
See application file for complete search history.

(56) References Cited

U.S. PATENT DOCUMENTS

| | | | |
|---|---|---|---|
| 6,845,671 B2 * | 1/2005 | Hull | 73/574 |
| 2004/0065152 A1 * | 4/2004 | Hull | 73/579 |
| 2009/0090166 A1 * | 4/2009 | Talley et al. | 73/12.06 |
| 2009/0308696 A1 * | 12/2009 | Utsunomiya | 187/401 |

* cited by examiner

*Primary Examiner*—Lisa M Caputo
*Assistant Examiner*—Jonathan Dunlap
(74) *Attorney, Agent, or Firm*—Matthias Scholl P.C.; Matthias Scholl

(57) ABSTRACT

Provided is a device for testing an isolation structure comprising an isolation layer having an upper beam, a lower beam and a top beam plate, along with an upper portion, the device comprising a plurality of upper corbels, a plurality of lower corbels, a plurality of hoisting jacks, a plurality of acceleration sensors, a plurality of displacement sensors, an acceleration collecting analyzer and a displacement collecting analyzer. A method for testing an isolation structure is also provided.

12 Claims, 3 Drawing Sheets

DEVICE AND METHOD FOR TESTING ISOLATION STRUCTURE

CROSS-REFERENCE TO RELATED APPLICATIONS

This application claims priority to Chinese Patent Application No. 200710009508.8 filed on Sep. 12, 2007. The contents of which are incorporated herein by reference.

BACKGROUND OF THE INVENTION

1. Field of the Invention

The invention relates to a device and a method, and more particularly to a device and a testing method of using the same for testing an isolation structure by means of propulsion-releasing.

2. Description of the Related Art

Conventional methods for testing an isolation structure comprise a pulsatory method, a steady sine wave excitation method, a random excitation method, an artificial explosion excitation method and so on. However, all these methods are incapable of generating external force to yield an isolation layer, may cause damage to the isolation structure, and feature poor test accuracy.

SUMMARY OF THE INVENTION

In view of the above-described problems, it is an objective of the invention to provide a device for testing an isolation structure that causes no damage to the isolation structure and features high test accuracy.

It is another objective of the invention to provide a method for testing an isolation structure that causes no damage to the isolation structure and features high test accuracy.

To achieve the above objectives, in accordance with one embodiment of the invention, provided is a device for testing an isolation structure comprising an isolation layer having an upper beam, a lower beam and a top beam plate, along with an upper portion, the device comprising a plurality of upper corbels, a plurality of lower corbels, a plurality of hoisting jacks, a plurality of acceleration sensors, a plurality of displacement sensors, an acceleration collecting analyzer and a displacement collecting analyzer.

In a class of this embodiment or in another embodiment, the upper corbels are disposed on the upper beam of the isolation layer of the isolation structure.

In a class of this embodiment or in another embodiment, the lower corbels are disposed on the lower beam in opposition to the upper beam.

In a class of this embodiment or in another embodiment, the hoisting jacks are disposed between the upper corbel and the lower corbel.

In a class of this embodiment or in another embodiment, the acceleration sensors are disposed on the upper portion of the isolation structure and the top beam plate of the isolation layer, and connected to the acceleration collecting analyzer.

In a class of this embodiment or in another embodiment, the displacement sensors are disposed between the upper beam and the lower beam of the isolation layer, and connected to the displacement collecting analyzer.

According to another embodiment of the invention, provide is a method for testing an isolation structure. The method is applied to a test device comprising a plurality of upper corbels, a plurality of lower corbels, a plurality of hoisting jacks, a plurality of acceleration sensors, a plurality of displacement sensors, an acceleration collecting analyzer and a displacement collecting analyzer, and comprises the steps of: starting a hydraulic system of the hoisting jack so that propulsion force is generated and relative displacement is generated between an upper portion of the isolation structure and the lower corbel; removing the hoisting jack so that free vibration of upper portion of the isolation structure occurs; recording free vibration of the upper portion and obtaining results via the acceleration sensors and the displacement sensors; sending the results to the acceleration collecting analyzer and the displacement collecting analyzer and analyzing the results by the acceleration collecting analyzer and the displacement collecting analyzer.

Advantages of the invention comprise:

1) the device and the method of the invention enable a lead core of an isolation bearing of a building to enter a yield state, and thus structural dynamic characteristics of the isolation layer in an operation state (namely in a medium or large scale of earthquake) are obtained, and further steps can be taken to improve seismic of the building;

2) compared to tests in the art, the test of the invention is based on real working conditions, structure of the isolation layer and dynamic characteristics of the isolation structure can be tested completely; and 3) by analyzing test results of the invention, whether the isolation structure is in good working condition and whether an expected test goal is realized can be determined, and hidden dangers can be removed accordingly.

BRIEF DESCRIPTION OF THE DRAWINGS

The invention is described hereinbelow with reference to accompanying drawings, in which.

Labels: 1. isolation layer; 11. isolation structure; 2. upper beam; 21. upper corbel; 22. top beam plate; 3. lower beam; 31. lower corbel; 4. hoisting jack; 5. acceleration sensor; 6. upper portion; 7. displacement sensor; 8. acceleration collecting analyzer; 9. displacement collecting analyzer.

DETAILED DESCRIPTION OF THE EMBODIMENTS

Figure 1:
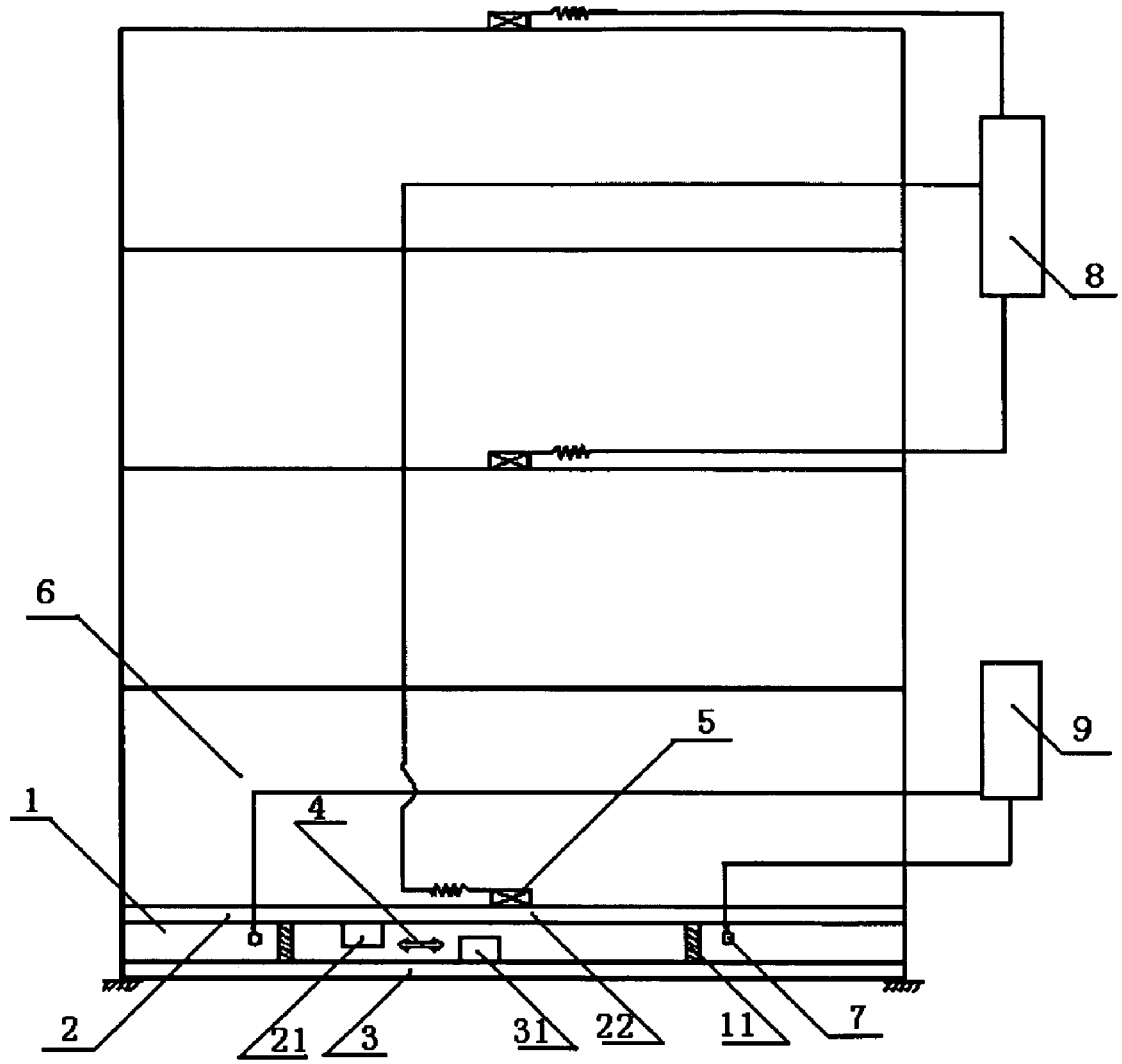
FIG. 1 is a schematic diagram of a device for testing an isolation structure in accordance with one embodiment of the invention.

As shown in FIG. 1, upper corbels 21 are disposed on an upper beam 2 of an isolation layer 1 of an isolation structure, and lower corbels 31 are disposed on a lower beam 3 in opposition to the upper beam 2. Hoisting jacks 4 are disposed between the upper corbel 21 and the lower corbel 31. Acceleration sensors 5 are disposed on upper portion 6 of the isolation structure and a top beam plate 22 of the isolation layer 1 and connected to an acceleration collecting analyzer 8. Displacement sensors 7 are disposed between the upper beam 2 and the lower beam 3 of the isolation layer 1 and connected to the displacement collecting analyzer 9.

A method for testing an isolation structure of the invention comprises the steps of: starting a hydraulic system of the hoisting jack 4 so that propulsion force is generated and relative displacement is generated between the upper corbel 21 and the lower corbel 31; removing the hoisting jack 4 so that free vibration of upper portion 6 of the isolation structure occurs; recording free vibration of the upper portion and obtaining results by acceleration sensors 5 and displacement sensors 7; sending the results to the acceleration collecting analyzer 8 and the displacement collecting analyzer 9 and analyzing the results by the acceleration collecting analyzer 8 and the displacement collecting analyzer 9.

The number of the upper corbels 2, the lower corbels 3 and the hoisting jack 4 is the same, and the number, via usual calculation method, is based on the total bearing capacity of the hoisting jacks 4 between the upper beam 2 and the lower beam 3. In other words, the total bearing capacity of the hoisting jacks 4 is more than twice the total yield force of the isolation layer 1.

Propulsion force generated by each hoisting jack 4 of the invention is the same and consistent with the bearing capacity of the upper corbels 21 and the lower corbels 31. The bearing capacity can be calculated via conventional computation.

The upper corbels 21 and the lower corbels 31 are disposed on the upper beam 2 and the lower beam 3 respectively by a post-anchoring technology or disposed directly while constructing. For a constructed isolation structure, the upper corbels 21 and the lower corbels 31 are disposed on the upper beam 2 and the lower beam 3 respectively by the post-anchoring technology. For an isolation structure still in construction, the upper corbels 21 and the lower corbels 31 are disposed on the upper beam 2 and the lower beam 3 directly.

The acceleration sensors 5 are disposed at least on the top and in the middle of the isolation structure and the top beam plate 22 of the isolation layer 1, so that the acceleration of vibration can be measured; the displacement sensors are disposed between the upper beam 2 and the lower beam 3 of the isolation layer 1 so that the displacement between the upper beam 2 and the lower beam 3 can be measured.

In this embodiment, the acceleration sensors 5 are high sensitivity acceleration sensors, and the displacement sensors 7 are high sensitivity displacement sensors.

Figure 2:
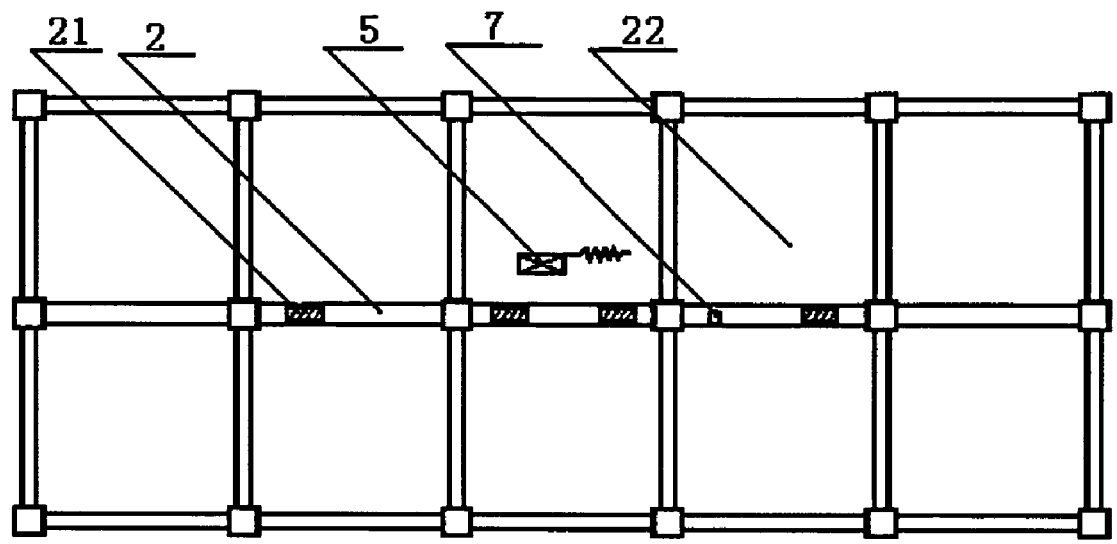
FIG. 2 is a schematic diagram of upper corbels and lower corbels disposed horizontally in an isolation structure in accordance with one embodiment of the invention.

As shown in FIG. 2, this schematic diagram is mainly to test horizontal dynamic characteristics of the isolation structure and a structure of a horizontal isolation layer.

Figure 3:
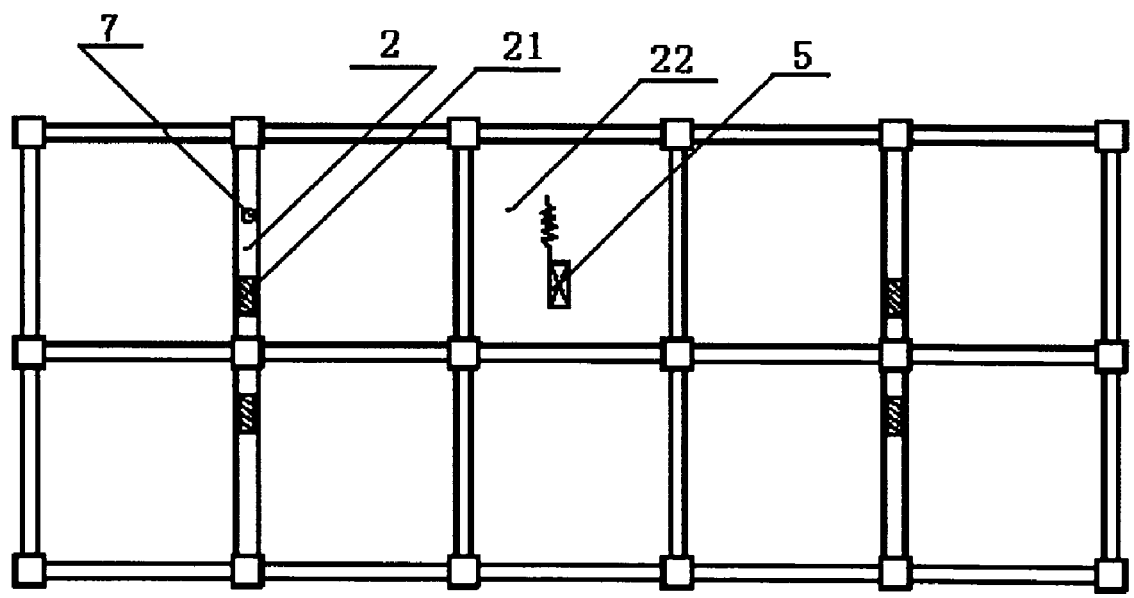
FIG. 3 is a schematic diagram of upper corbels and lower corbels disposed vertically in an isolation structure in accordance with one embodiment of the invention.

As shown in FIG. 3, this schematic diagram is mainly to test vertical dynamic characteristics of the isolation structure and a structure of a vertical isolation layer.

Figure 4:
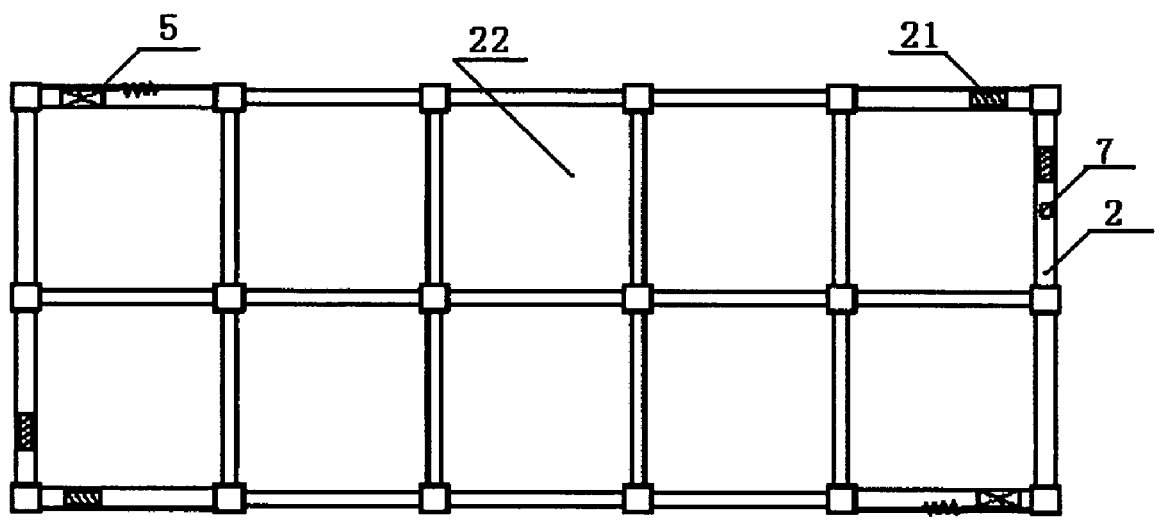
FIG. 4 is a schematic diagram of upper corbels and lower corbels disposed diagonally in an isolation structure in accordance with one embodiment of the invention.

As shown in FIG. 4, this schematic diagram is mainly to measure the torsional dynamic characteristics of the isolation structure and a structure of the isolation layer.

It should be noted that other arrangements of the upper corbels and the lower corbels in an isolation structure can also be adopted as long as a desired measuring goal can be realized.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

What is claimed is:

1. A device for testing an isolation structure, the isolation structure comprising an isolation layer having an upper beam, a lower beam and a top beam plate, along with an upper portion, said device comprising:
   a) a plurality of upper corbels;
   b) a plurality of lower corbels;
   c) a plurality of hoisting jacks;
   d) a plurality of acceleration sensors;
   e) a plurality of displacement sensors;
   f) an acceleration collecting analyzer; and
   g) a displacement collecting analyzer;
wherein
   said upper corbels are disposed on said upper beam of said isolation layer of said isolation structure;
   said lower corbels are disposed on said lower beam in opposition to said upper beam;
   said hoisting jacks are disposed between said upper corbels and said lower corbels;
   said acceleration sensors are disposed on said upper portion of said isolation structure and said top beam plate of said isolation layer, and connected to said acceleration collecting analyzer; and
   said displacement sensors are disposed between said upper beam and said lower beam of said isolation layer, and connected to said displacement collecting analyzer.

2. The device of claim 1, wherein the total bearing capacity of all said hoisting jacks between said upper beam and said lower beam is more than twice the total yield force of said isolation layer.

3. The device of claim 1, wherein all said hoisting jacks have the same propulsion force.

4. The device of claim 3, wherein the propulsion force of said hoisting jack is consistent with bearing capacity of said upper corbel and said lower corbel.

5. The device of claim 1, wherein said upper corbels and said lower corbels are respectively disposed on said upper beam and said lower beam via a post-anchoring technology.

6. The device of claim 1, wherein said upper corbels and said lower corbels are respectively disposed on said upper beam and said lower beam via direct construction.

7. The device of claim 1, wherein said acceleration sensors are high sensitivity acceleration sensors.

8. The device of claim 1, wherein said displacement sensors are high sensitivity displacement sensors.

9. The device of claim 1, wherein said upper corbels and said lower corbels are disposed horizontally.

10. The device of claim 1, wherein said upper corbels and said lower corbels are disposed vertically.

11. The device of claim 1, wherein said upper corbels and said lower corbels are disposed diagonally.

12. A method for testing an isolation structure, the method applied to a test device comprising a plurality of upper corbels, a plurality of lower corbels, a plurality of hoisting jacks, a plurality of acceleration sensors, a plurality of displacement sensors, an acceleration collecting analyzer and a displacement collecting analyzer, and comprising the steps of:
   a) starting a hydraulic system of said hoisting jack so that propulsion force is generated and relative displacement is generated between an upper portion of the isolation structure and said lower corbels;
   b) removing said hoisting jack so that free vibration of said upper portion of said isolation structure occurs;
   c) recording free vibration of said upper portion and obtaining results by said acceleration sensors and said displacement sensors;
   d) sending said results to said acceleration collecting analyzer and said displacement collecting analyzer; and
   e) analyzing said results by said acceleration collecting analyzer and said displacement collecting analyzer.

* * * * *